United States Patent [19]

Suzuki

[11] Patent Number: 5,595,841
[45] Date of Patent: Jan. 21, 1997

[54] NONAQUEOUS SECONDARY BATTERY

[75] Inventor: Ryuta Suzuki, Kanagawa, Japan

[73] Assignee: Fuji Photo Film Co., Ltd., Kanagawa, Japan

[21] Appl. No.: 633,011

[22] Filed: Apr. 16, 1996

[30] Foreign Application Priority Data

Apr. 19, 1995 [JP] Japan .................................. 7-093768

[51] Int. Cl.$^6$ .................................................. H01M 4/62
[52] U.S. Cl. ........................................... 429/217; 429/194
[58] Field of Search .................................... 429/217, 194

[56] References Cited

U.S. PATENT DOCUMENTS

| 4,368,244 | 1/1983 | Danzig | 429/217 |
| 4,563,404 | 1/1986 | Bahary | 429/217 X |

FOREIGN PATENT DOCUMENTS 6-150906  5/1994  Japan .............................. H01M 4/02

Primary Examiner—John S. Maples
Attorney, Agent, or Firm—Sughrue, Mion, Zinn, Macpeak & Seas

[57] ABSTRACT

A nonaqueous secondary battery excellent in charge and discharge cycle characteristics and having a high capacity and improved first cycle efficiency and production fitness is disclosed, which comprises a battery case enclosing therein a positive electrode and a negative electrode capable of intercalating and deintercalating lithium and a nonaqueous electrolytic solution containing a lithium salt, wherein one or both of the positive electrode and the negative electrode contains a copolymer comprising an acrylic or methacrylic ester, acrylonitrile and a vinyl monomer having an acid moiety.

5 Claims, 1 Drawing Sheet

NONAQUEOUS SECONDARY BATTERY

FIELD OF THE INVENTION

This invention relates to a nonaqueous secondary battery having improved charge and discharge cycle characteristics, capacity, first cycle efficiency and production fitness.

BACKGROUND OF THE INVENTION

In general, a polymer compound is used as a binder in the active material mixture of Li secondary battery electrodes. Fluorine base resins are conventionally known as the polymer compound, but still having subjects to be improved such as inhibition of conductivity when electrode membranes are formed and insufficient adhesion between collector and electrode membranes. Because of this, non-fluorine polymer compounds have been developed such as an acrylonitrile polymer as disclosed in JP-A-63-121257 (the term "JP-A" as used herein means an "unexamined published Japanese patent application"), SBR and the like as disclosed in JP-A-5-225982 and a polyester polymer as disclosed in JP-A-1-186557. These compounds, however, are not sufficient in resolving the aforementioned problems and cause another problems such as their elution into the electrolytic solution or swelling therein. In order to resolve these problems, JP-A-6-150906 proposes the use of an aqueous dispersion of a non-fluorine base polymer, but its improving effects are not sufficient and it has disadvantages in terms of cycle characteristics and the like battery performance and production fitness.

SUMMARY OF THE INVENTION

In view of the above, it therefore becomes an object of the present invention to provide a nonaqueous secondary battery having good cycle characteristics, a high capacity and improved first cycle efficiency and production fitness.

The object of the present invention has been achieved by a nonaqueous secondary battery which comprises a battery case enclosing therein a positive electrode and a negative electrode capable of intercalating and deintercalating lithium and a nonaqueous electrolytic solution containing a lithium salt, wherein one or both of the positive electrode and the negative electrode contain a copolymer comprising an acrylic or methacrylic ester, acrylonitrile and a vinyl monomer having an acid moiety.

Preferred embodiments of the present invention include:

(1) the nonaqueous electrolyte secondary battery wherein the acrylic or methacrylic ester is a compound represented by the following formula (1) and the vinyl monomer having an acid moiety is acrylic acid, methacrylic acid or maleic acid:

wherein $R_1$ represents an alkyl group having 3 to 16 carbon atoms and $R_2$ represents a hydrogen atom or a methyl group, (2) the nonaqueous electrolyte secondary battery wherein the positive electrode contains the copolymer;

(3) the nonaqueous electrolyte secondary battery wherein the aforementioned positive electrode contains the aforementioned copolymer, a fluorocarbon resin and carboxymethyl cellulose; and (4) the nonaqueous secondary battery wherein a negative electrode active material contained in the negative electrode is an inorganic oxide which intercalates and deintercalates lithium, and the molar ratio of a positive electrode active material contained in the positive electrode to the negative electrode active material is within the range of from 2.0 to 12.0.

Other objects and advantages of the present invention will be made apparent as the description progresses.

DETAILED DESCRIPTION OF THE INVENTION

Figure 1:
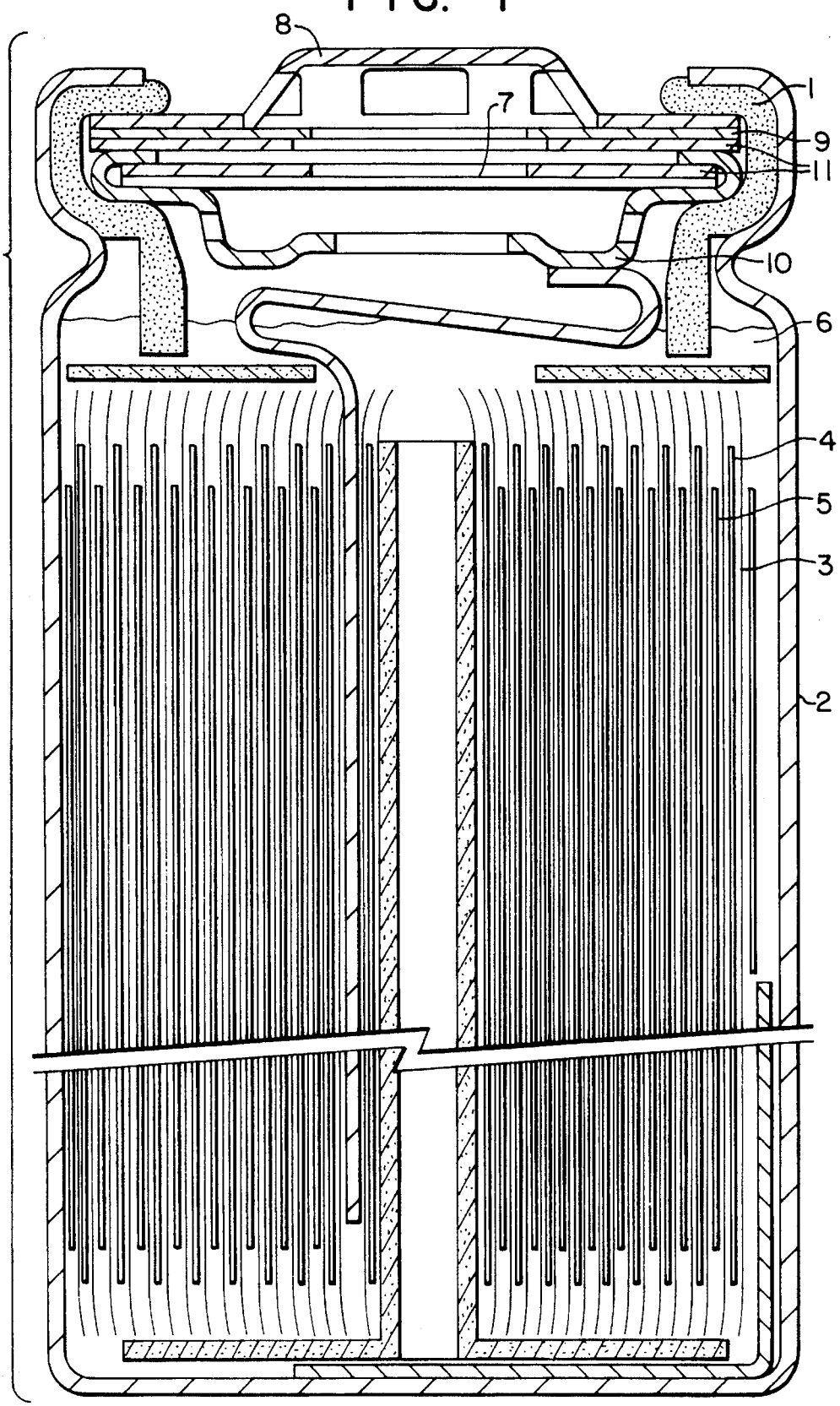
FIG. 1 is a cross section of a cylindrical battery used in Examples, wherein 1 indicates a polypropylene insulation sealing body, 2 indicates a negative electrode case (battery case) which also serves as a negative electrode terminal, 3 indicates a negative electrode sheet, 4 indicates a separator, 5 indicates a positive electrode sheet, 6 indicates a liquid nonaqueous electrolytic solution, 7 indicates a safety valve, 8 indicates a positive electrode cap which also serves as a positive electrode terminal, 9 indicates a PTC element, 10 indicates a sealing plate and 11 indicates a ring.

The copolymer of the present invention is a copolymer comprising an acrylic or methacrylic ester, acrylonitrile and a vinyl monomer having an acid moiety.

The acrylic or methacrylic ester is represented by the aforementioned formula (1) wherein $R_1$ is an alkyl group having 3 to 16 carbon atoms and $R_2$ is hydrogen atom or a methyl group. Specific examples of the acrylic or methacrylic ester include butyl methacrylate, pentyl methacrylate, hexyl methacrylate, heptyl methacrylate, octyl methacrylate, nonyl methacrylate, decyl methacrylate, propyl acrylate, n-butyl acrylate, isobutyl acrylate, t-butyl acrylate, pentyl acrylate, hexyl acrylate, heptyl acrylate, octyl acrylate, 2-ethylhexyl acrylate, nonyl acrylate, decyl acrylate and the like, of which heptyl acrylate, octyl acrylate, 2-ethylhexyl acrylate and nonyl acrylate are preferred and nonyl acrylate and 2-ethylhexyl acrylate are particularly preferred.

Specific examples of the vinyl monomer having an acid moiety include acrylic acid, methacrylic acid and maleic acid, of which acrylic acid and methacrylic acid are preferred.

A preferred composition of the components of the copolymer of the present invention comprises 50 to 95 mol % of a acrylic or methacrylic ester (to be referred to as "component A" hereinafter), 3 to 40 mol % of acrylonitrile (to be referred to as "component B" hereinafter) and 1 to 25 mol % of a vinyl monomer having an acid moiety (to be referred to as "component C" hereinafter), based on the whole components of the copolymer. More preferably, the component A is within the range of from 60 to 90 mol %, the component B is within the range of from 5 to 30 mol % and the component C is within the range of from 3 to 20 mol %.

In addition to the above components A, B and C, the copolymer of the present invention may further contain other repeating units. The term "other repeating units" as used herein means repeating units derived from other vinyl monomers, such as monofunctional monomers (e.g., styrene, α-methylstyrene, chlorostyrene, acrylamide, vinyl benzyl alcohol, styrene sulfinate, styrene sulfonate and the like) and bifunctional monomers (e.g., divinylbenzene, ethylene glycol dimethacrylate, isopropylene glycol diacrylate, tetramethylene glycol dimethacrylate and the like).

The copolymer of the present invention may preferably be in a latex form. When a latex is formed, the aforementioned bifunctional monomers may be used as crosslinking agents. These crosslinking agents can be used in an amount of 15 mol % or less, preferably 10 mol % or less, based on the whole components of the copolymer. Preferably, the copolymer of the present invention is used as a water dispersion which may be in the form of either a polymer emulsion or a latex. The latex may be crosslinked or not crosslinked.

Polymerization of the copolymer of the present invention may be effected by solution polymerization, emulsion polymerization, suspension polymerization or vapor phase polymerization, and the resulting polymer may have a random type, graft type or block type structure. The polymer has a viscosity-average molecular weight of preferably 20,000 to 1,000,000 and more preferably 100,000 to 500,000.

The water dispersion of the copolymer of the present invention can contain anionic, nonionic and the like surfactants which may be preferably used in combination. These surfactants may be used in an amount of from 0.01 to 3%, preferably from 0.1 to 2%, more preferably from 0.5 to 1.5%, based on the weight of copolymer.

Preferred examples of the composition of the copolymer of the present invention are shown below, though the present invention is not limited by these examples. The solid content of the water dispersion was adjusted to 50% by weight.

P-1: Water dispersion of a copolymer comprising 2-ethylhexyl acrylate, acrylic acid and acrylonitrile (copolymerization ratio=80:5:15)

P-2: Water dispersion of a copolymer comprising nonyl acrylate, acrylic acid, acrylonitrile and styrene (copolymerization ratio=82:3:10:5)

P-3: Water dispersion of a copolymer comprising 2-ethylhexyl acrylate, acrylic acid, acrylonitrile and divinylbenzene (copolymerization ratio=80:5:10:5)

P-4: Water dispersion of a copolymer comprising butyl acrylate, acrylic acid and acrylonitrile (copolymerization ratio=90:3:7)

P-5: Water dispersion of a copolymer comprising butyl acrylate, acrylic acid, acrylonitrile and divinylbenzene (copolymerization ratio=80:5:10:5)

P-6: Water dispersion of a copolymer composed of 2-ethylhexyl acrylate, maleic acid and acrylonitrile (copolymerization ratio=80:5:15)

P-7: Water dispersion of a copolymer comprising 2-ethylhexyl acrylate, methacrylic acid and acrylonitrile (copolymerization ratio=80:5:15)

P-8: Water dispersion of a copolymer comprising 2-ethylhexyl acrylate, acrylic acid and acrylonitrile (copolymerization ratio=60:15:25)

P-9: Copolymer comprising 2-ethylhexyl acrylate, acrylic acid and acrylonitrile (copolymerization ratio=80:5:15)

P-10: Copolymer comprising butyl acrylate, acrylic acid and acrylonitrile (copolymerization ratio=90:3:7)

P-11: Water dispersion of a copolymer comprising ethyl acrylate, acrylic acid and acrylonitrile (copolymerization ratio=80:5:15)

P-12: Water dispersion of a copolymer comprising 2-ethylhexyl acrylate, acrylic acid and acrylonitrile (copolymerization ratio=50:20:30)

Examples of other binders which can be used in combination with the copolymer (binder) of the present invention include polysaccharides, thermoplastic resins, and polymers having rubber elasticity; such as starch, polyvinyl alcohol, carboxymethyl cellulose, hydroxypropyl cellulose, regenerated cellulose, diacetyl cellulose, polyvinyl chloride, polyvinyl pyrrolidone, tetrafluoroethylene, polyvinylidene fluoride, polyethylene, polypropylene, ethylene-propylene-diene terpolymers (EPDM), sulfonated EPDM, styrene-butadiene rubbers, polybutadiene, fluorine resins, polyethylene oxide and the like, which may be used alone or as a mixture of two or more of them. In using a compound having a functional group reactive with lithium, such as a polysaccharide, it is preferable to deactivate the functional group by addition of a compound having an isocyanate group. Of these binders, fluorine resins and carboxymethyl cellulose are particularly preferred.

Examples of the fluorine resins which can be jointly use in combination with the copolymer of the present invention include polytetrafluoroethylene (PTFE), tetrafluoroethylene-hexafluoropropylene copolymer (FEP), tetrafluoroethylene-perfluoroalkyl vinyl ether copolymer (PFA), polychlorotrifluoroethylene (PCTFE), polyvinylidene fluoride (PVDF), polyvinyl fluoride, ethylenetetrafluoroethylene copolymer (ETFE resin), ethylenechlorotrifluoroethylene copolymer (ECTFE) and the like.

Carboxymethyl cellulose which can be used in combination with the copolymer of the present invention may have a (viscosity-average) molecular weight of preferably from 100,000 to 5,000,000, more preferably from 200,000 to 1,000,000. Also, it may have an etherification degree of preferably from 0.5 to 1.0, more preferably from 0.6 to 0.8.

The copolymer of the present invention may be used in combination with other binders (for example, fluorine resins, carboxymethyl cellulose and the like).

The total amount of the binders to be used in the present invention may be in the range of from 1 to 40% by weight, preferably from 2 to 30% by weight, of the active material mixture.

The positive electrode active material to be used in the present invention may be a transition metal oxide which can intercalate and deintercalate lithium ions reversibly, of which a lithium-containing transition metal oxide is particularly preferred.

Examples of the lithium-containing transition metal oxide which may be used as the positive electrode active material of the present invention include lithium-containing oxides of Ti, V, Cr, Mn, Fe, Co, Ni, Cu, Mo and W. Also, it may be mixed with alkali metals other than lithium and alkaline earth metals (elements of the groups 1 and 2 of the periodic table), metalloids Al, Ga, In, Ge, Sn, Pb, Sb, Bi and the like, in an amount of preferably from 0 to 10 mol %, based on the total positive electrode active material.

A preferred lithium-containing transition metal oxide to be used as the positive electrode active material of the present invention may be synthesized by mixing the components in such amounts that the total molar ratio of lithium compound/transition metal compound (the transition metal means at least one metal selected from Ti, V, Cr, Mn, Fe, Co, Ni, Mo and W) becomes 0.3 to 2.2.

A still preferred lithium-containing transition metal oxide to be used as the positive electrode active material of the present invention may be synthesized by mixing the components in such amounts that the total molar ratio of lithium compound/transition metal compound (the transition metal means at least one metal selected from V, Cr, Mn, Fe, Co and Ni) becomes 0.3 to 2.2.

Examples of the further preferred lithium-containing transition metal oxide to be used as the positive electrode active material of the present invention are those represented by formula $Li_xMO_z$ (wherein M is at least one transition metal selected from Co, Mn, Ni, V and Fe, x is 0.3 to 1.2 and z is 1.4 to 3).

Examples of suitable lithium-containing metal oxide to be used as the positive electrode active material of the present invention include $Li_xCoO_2$, $Li_xNiO_2$, $Li_xCo_aNi_{1-a}O_2$, $Li_zCO_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_z$, $Li_xMn_cFe_{2-c}O_4$, a mixture of $Li_xMn_2O_4$ and $MnO_2$, a mixture of $Li_{2x}MnO_3$ and $MnO_2$ and a mixture of $Li_xMn_2O_4$, $Li_{2x}MnO_3$ and $MnO_2$ (wherein x is 0.6 to 1.2, a is 0.1 to 0.9, b is 0.8 to 0.98, c is 1.6 to 1.96 and z is 2.01 to 5).

Examples of preferred lithium-containing metal oxide to be used as the positive electrode active material of the present invention include $Li_xCoO_2$, $Li_xNiO_2$, $Li_xCO_aNi_{1-a}O_2$, $Li_xCO_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$ and $Li_xMn_cFe_{2-c}O_4$ (wherein x is 0.7 to 1.04, a is 0.1 to 0.9, b is 0.8 to 0.98, c is 1.6 to 1.96 and z is 2.01 to 2.3).

Examples of the further preferred lithium-containing transition metal oxides to be used as the positive electrode active material of the present invention include $Li_xCoO_2$, $Li_xNiO_2$, $Li_xCo_aNi_{1-a}O_2$, $Li_xMn_2O_4$ and $Li_xCO_bV_{1-b}O_z$ (wherein x is 0.7 to 1.04, a is 0.1 to 0.9, b is 0.9 to 0.98 and z is 2.02 to 2.3).

In this connection, the aforementioned value x is a value before commencement of charge and discharge, so that it increases and decreases by the charge and discharge.

In synthesizing the positive electrode active material of the present invention, chemical intercalation of lithium ions into a transition metal oxide is preferably effected by allowing the transition metal oxide to react with metallic lithium, lithium alloy or butyl lithium.

The positive electrode active material can be synthesized by a method in which a lithium compound and a transition metal compound are mixed and calcined or by a solution reaction, preferably by the calcination method.

The calcination according to the present invention may be carried out at such a temperature that the mixed compounds to be used in the present invention partially decompose and melt, for example, at a temperature of preferably from 250° to 2,000° C., more preferably from 350° to 1,500° C.

Though the calcination gas atmosphere to be used in the present invention is not particularly limited, it is preferred that the calcination be carried out in the air or a gas which is relatively rich in oxygen (about 30% or more, for example) in the case of the positive electrode active material, or in the air or a gas which is relatively poor in oxygen (about 10% or less, for example) or an inert gas (nitrogen or argon gas) in the case of the negative electrode active material.

Though not particularly limited, the positive electrode active material to be used in the present invention may have an average particle size of preferably from 0.1 to 50 µm.

The calcined product may be ground to a desired size by means of well-known grinding machines or classifiers, such as a mortar, a ball mill, a vibration ball mill, a satellite ball mill, a planetary ball mill, a spinning air flow type jet mill, a sieve and the like.

The molar ratio of the positive electrode active material to the negative electrode material to be used in the nonaqueous secondary battery of the present invention is within the range of from 2.0 to 12.0, preferably from 3.0 to 11.0, more preferably from 5.0 to 9.0.

The term "molar ratio" as used herein means a value obtained by dividing mol numbers of the positive electrode active material (total mol number of all positive electrode active materials when a plurality of positive electrode active materials are present) by mol numbers of the negative electrode active material (total mol number of all negative electrode active materials when a plurality of negative electrode active materials are present). Also, the term "mol numbers" as used herein means a value when 1 mol is expressed as $LiA_vB_w$ in the case of the positive electrode active material (wherein B is a halogen atom or a chalcogen atom including oxygen, A is not Li but an atom or a plurality of atoms which are not included in B and each of v and w is a positive real number), or when 1 mol is expressed as $Li_xCD_y$ in the case of the negative electrode active material (wherein D is a halogen atom or a chalcogen atom including oxygen, C is not Li but an atom or a plurality of atoms which are not included in D, and each of x and y is a value when the total mol number of atoms contained in C is defined as 1 and x is 0 or a positive real number and y is a positive real number).

According to the present invention, the amount of the electrolytic solution per 1 g of the total of the positive and negative electrode materials is within the range of preferably from 0.05 to 0.5 ml, more preferably from 0.1 to 0.4 ml, most preferably from 0.15 to 0.3 ml.

According to the present invention, the ratio of the total volume of the positive and negative electrodes (volume including active materials, conductive materials, binders, collectors and the like, more particularly, the sum of "width ×length×thickness" of the positive electrode sheet and "width×length×thickness" of the negative electrode sheet (thickness is measured using a pair of slide calipers or a micrometer)) to the volume of the battery is within the range of preferably from 0.4 to 0.7, more preferably from 0.45 to 0.65, most preferably from 0.5 to 0.6, and the ratio of the facing area of the positive and negative electrodes of the battery to the volume of the battery is within the range of preferably from 15 to 50 $cm^2$/ml, more preferably from 20 to 40 $cm^2$/ml, most preferably from 25 to 30 $cm^2$/ml.

The term "volume of battery" as used herein means not the inner volume of the battery but the total volume of the battery case and the battery including spaces inside the battery.

More specifically, in the case of an AA type battery (battery volume=7.2 ml) having a unit cell outer diameter of 13.8 mm and a unit cell height (shoulder height) of 48.00 mm, the length of the positive electrode is preferably from 180 to 330 mm, more preferably from 220 to 290 mm, most preferably from 240 to 270 mm. The length of the negative electrode is preferably from 200 to 380 mm, more preferably from 220 to 300 mm, most preferably from 250 to 280 mm. The width of the positive electrode is preferably from 32 to 45 mm, more preferably from 35 to 41 mm, most preferably from 37 to 39 mm, and that of the negative electrode is preferably from 35 to 46 mm, more preferably from 38 to 44 mm, most preferably from 40 to 42 mm. The thickness of the positive electrode is preferably from 150 to 400 µm, more preferably from 200 µm to 300 µm, most preferably from 230 to 270 µm, and that of the negative electrode is preferably from 60 to 200 µm, more preferably from 90 µm to 180 µm, most preferably from 110 to 130 µm. The facing area of the positive and negative electrodes is preferably from 100 to 400 $cm^2$, more preferably from 120 to 300 $cm^2$, most preferably from 150 to 250 $cm^2$.

According to the present invention, the diameter of the electrode body is a circumscribed circle diameter of the section of an approximately cylindrical body prepared by rolling up a positive electrode, a negative electrode and a separator. Though the diameter of the sectional circle of the electrode body slightly varies depending on the sectioned position due to roll-stopping tape on its outermost peripheral, lead tab around its peripheral and the like, the diameter of the electrode body means two times of a distance between its circumcenter and a position where strongest stress is applied when the electrode is inserted or after calibration of the battery. The outer portion does not include an overhanging where stress is not substantially applied, such as a part where apparent circumscribed circle diameter is increased due to partial turn up of the separator edge. Also, when the section becomes approximately circular or approximately oval due to relatively flexible deformation of the electrode body, the diameter of this portion is substantially maximum circumscribed circle diameter when it becomes approximately circular. More specifically, the difference between the electrode body diameter of the battery and the inner diameter of the battery case is within the range of preferably from 30 to 300 μm, more preferably from 100 to 250 μm, most preferably from 150 to 200 μm.

The inorganic oxide to be used in the negative electrode active material of the present invention is selected from transition metal oxides and metalloid oxides. The transition metal oxide is selected from V, Ti, Fe, Mn, Co, Ni and Zn or mixtures thereof. For example, lithium-containing transition metal oxides composed of $Fe_2O_3$, $Co_2O_3$, $WO_2$, $WO_3$, $MoO_2$ and $MoO_3$ are preferred, of which those represented by formula $Li_eM_fO_g$ (wherein M is at least one metal selected from V, Ti, Mn, Fe, Co, Ni and Zn, e is 0.1 to 3, f is 1 or 2 and g is 1 to 5.5) is particularly preferred.

Among them, those represented by formula $Li_pCO_qV_{1-q}O_r$ (wherein q is 0.1 to 2.5, p is 0 to 1 and r is 1.3 to 4.5) are preferred.

The inorganic oxide may also be selected from oxides of the elements of the groups 13 to 15 of the periodic table, such as of Al, Si, Sn, Ge, Pb, Sb and Bi or mixtures thereof. Preferred examples of the oxides include those containing $Al_2O_3$, $SiO_2$, $GeO$, $GeO_2$, $SnO$, $SnO_2$, $SnSiO_3$, $PbO$, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $Bi_2O_5$, $Li_2SiO_3$, $Li_4Si_2O_7$, $Li_2Si_3O_7$, $Li_2Si_2O_5$, $Li_8SiO_6$, $Li_6Si_2O_7$, $Li_2GeO_3$, $Li_4GeO_4$, $Li_8GeO_6$, $Li_2SnO_3$, $Li_8SnO_6$, $Li_2PbO_3$, $Li_4PbO_4$, $LiBiO_2$, $Li_3BiO_4$, $Li_5BiO_5$, $LiSbO_4$, $Li_4MgSn_2O_7$, $Li_2MgSn_2O_5$ or the like. An inorganic chalcogenide may be selected from sulfides of the metals and metalloids used in the above inorganic oxides. Preferred examples of the sulfide include those containing $TiS_2$, $GeS$, $GeS_2$, $SnS$, $SnS_2$, $PbS$, $PbS_2$, $Sb_2S_3$, $Sb_2S_5$, $SnSiS_3$ or the like. Of the above compounds, those containing $SnO$, $SnO_2$, $GeO$, $GEO_2$, $SnSiO_3$ or $LiSnO_3$ are preferred.

The aforementioned inorganic oxides are preferred, because they are effective in providing high capacity, high discharge potential, high safety and high cycle characteristics.

The negative electrode active material precursor of the present invention may contain various compounds such as transition metals (elements of the 4th, 5th and 6th periods of the periodic table, belonging to the groups 3 to 11), elements of the group 13 of the periodic table and alkali metals and alkaline earth metals (elements of the groups 1 and 2 in the periodic table), as well as P, Cl, Br, I and F.

For example, $SnO_2$ may contain dopants of various compounds (for example, compounds of Sb, In and Nb) for improving electrical conductivity or Si as a congenic element. The addition amount thereof is preferably 0 to 20 mol %, based on the total negative electrode active material.

The negative electrode active material can be synthesized in the following manner. In the case of $SnO_2$, an aqueous solution of an Sn compound such as stannic chloride, stannic bromide, stannic sulfate, stannic nitrate or the like is mixed with an aqueous solution of an alkali hydroxide such as lithium hydroxide, sodium hydroxide, potassium hydroxide, calcium hydroxide, magnesium hydroxide, ammonium hydroxide or the like, and the thus precipitated stannic hydroxide is washed and separated. The thus separated stannic hydroxide is nearly dried and then calcined at a temperature of from 250° to 2,000° C. in the air, an oxygen-rich gas or an oxygen-poor gas. Alternatively, the precipitated stannic hydroxide may be directly calcined and then washed. The primary particles may have an average particle size of preferably from 0.01 to 1 μm, more preferably from 0.02 to 0.2 μm, as measured by a scanning electron microscope. The secondary particles may have an average particle size of preferably from 0.1 to 60 μm. In the case of SnO, an aqueous solution of stannous chloride, stannous bromide, stannous sulfate, stannous nitrate or the like is mixed with an aqueous solution of an alkali hydroxide such as lithium hydroxide, sodium hydroxide, potassium hydroxide, calcium hydroxide, magnesium hydroxide, ammonium hydroxide or the like, and the mixture is boiled. Also, stannous oxalate is calcined at a temperature of from 250° to 1,000° C. in an oxygen-poor gas. Preferably, the particles may have an average particle size of from 0.1 to 60 μm.

Other oxides can be synthesized by well known methods similar to the case of $SnO_2$ and SnO. Their preferred physical properties are the same as the case of SnO described in the foregoing.

The calcined product can be ground to a desired size by means of well-known grinding machines or classifiers, such as a mortar, a ball mill, a vibration ball mill, a satellite ball mill, a planetary ball mill, a spinning air flow type jet mill, a sieve and the like.

The negative electrode active material to be used in the present invention can be obtained by chemically intercalating lithium, for example by a reaction with lithium metal, lithium alloy, butyl lithium or the like or by an electrochemical means.

According to the present invention, electrochemical intercalation of lithium into an oxide is particularly preferred. Electrochemical intercalation of lithium can be effected by discharging an oxidation-reduction system (for example, an open system (electrolysis) or a closed system (battery)) consisting of an oxide of interest (the negative electrode active material precursor according to the present invention) as the positive electrode active material and a metallic lithium- or lithium salt-containing nonaqueous electrolytic solution as the negative electrode active material. In another and further preferred embodiment of the present invention, it is effected by discharging an oxidation-reduction system (for example, an open system (electrolysis) or a closed system (battery)) comprising a lithium-containing transition metal oxide as the positive electrode active material and a nonaqueous electrolytic solution containing a negative electrode active material and a lithium salt as the negative electrode active material.

When lithium is electrochemically intercalated, it is preferable to apply 0.04 to 1 A of current per 1 g of the oxide. Surprisingly, the present inventors found that intercalation of lithium when electrified at a lower level than the above range results in the formation of a compound having low reversibility. It is preferable to electrify the current at the early stage of the first cycle, particularly within about 30% of the required capacity of the first cycle. For example, it is preferable to electrify higher current continuously until the voltage becomes about 0.6 V or lower based on Li-Al (80–20% by weight). Thereafter, it may be either high current or low current. It is more preferable to apply 0.06 to 0.8 A of current per 1 g of the precursor oxide.

The intercalation quantity of lithium is not particularly limited, but it is preferred to intercalate until the voltage becomes about 0.05 V, more preferably until 0.1 V, particularly preferably until 0.15 V, for example, based on Li-Al (80–20% by weight).

At this stage, the lithium intercalation becomes 3 to 10 equivalents. The ratio of a positive electrode active material to a negative electrode active material is decided according to the above-mentioned equivalent amount. It is preferable to use a positive electrode active material in an amount based on the calculated ratio multiplied by a factor of 0.5 to 2. Where another substance other than the positive electrode active material (for example, metallic lithium, a lithium alloy, butyl lithium and the like) is used as a lithium source, the amount of a positive electrode active material to be used is decided in accordance with the equivalent amount of deintercalated lithium of the negative electrode active material. In this case, the ratio based on the equivalent amount is also preferably multiplied by a factor of 0.5 to 2.

The present inventors found that, when the oxide of the present invention is used as a negative electrode active material, "it is not reduced to respective metal (alloy with lithium) by the intercalation of lithium". This can be deduced from the facts that (1) precipitation of metals (particularly precipitation of dendrite) was not detectable when observed under a transmission electron microscope, (2) potential of metal-mediated intercalation/deintercalation of lithium was different from that of the oxide and (3) loss of deintercalation to intercalation of lithium was about 1 equivalent in the case of SnO, which did not coincide with the 2 equivalent loss in the case of the generation of metallic tin. Since the potential of the oxide is close to those of conventionally used calcined carbonaceous compounds, it is assumed that the oxide is under a condition which is neither a simple ionic bond nor a simple metallic bond. In consequence, the present invention is an invention distinctly different from the prior art lithium alloys.

The oxide of the present invention has a crystalline structure, and its crystalline property is reduced and changed into amorphous nature when lithium is intercalated. In consequence, the oxide of the present invention may have any one of crystalline structure, amorphous structure and mixed structure thereof.

Negative electrode active materials which can be used in combination with the negative electrode active material of the present invention include metallic lithium, lithium alloys (e.g., alloys with Al, Al-Mn, Al-Mg, Al-Sn, Al-In or Al-Cd and the like) and calcined carbonaceous compounds capable of intercalating and deintercalating a lithium ion or metallic lithium.

The purpose of the combined use of metallic lithium or a lithium alloy is to intercalate lithium within a cell but not to utilize the dissolution-precipitation reaction of metallic lithium and the like as a battery reaction.

In addition to the aforementioned binders, a conducting agent, a filler and the like may be added to the electrode material mixture.

The conducting agent may be any electron-conducting material which undergoes no chemical change in an assembled battery. Suitable conducting agents include natural graphite (scale graphite, flake graphite, lumpy graphite and the like), artificial graphite, carbon black, acetylene black, Ketjen black, carbon fiber, metal powders (copper, nickel, aluminum or silver powder), metallic fibers, polyphenylene derivatives, and mixtures of two or more thereof. Combination of graphite and acetylene black is particularly preferred, to which nickel powder may be further added. As the nickel powder, porous nickel powder is particularly preferred.

Amount of these additives is not particularly limited, but is within the range of preferably from 1 to 50% by weight, more preferably from 2 to 30% by weight, of the total amount of the electrode material mixture. The amount of the aforementioned conducting agent can be reduced when the active material precursor is provided with electronic conductivity like the case of $SnO_2$ doped with Sb. In this case, for example, it may be added in an amount of preferably from 0 to 10% by weight.

The filler is not particularly limited as long as it is a fibrous material undergoing no chemical changes in the assembled battery. In general, fibers of polypropylene, polyethylene and the like polyolefins, glass, carbon and the like are used as the filler. Though not particularly limited, the filler is preferably used in an amount of up to 20% by weight based on the total weight of the active material mixture.

The electrolytic solution comprises at least one aprotic organic solvent and at least one lithium salt soluble in the solvent. Examples of the aprotic organic solvent include propylene carbonate, ethylene carbonate, butylene carbonate, dimethyl carbonate, diethyl carbonate, γ-butyrolactone, 1,2-dimethoxyethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, methyl propionate, ethyl propionate, phosphoric triesters, trimethoxymethane, dioxolane derivatives, sulfolane, 3-methyl-2-oxazolidinone, propylene carbonate derivatives, tetrahydrofuran derivatives, diethyl ether, 1,3-propanesultone and the like. These solvents may be used either individually or in combination of two or more thereof. Examples of the lithium salt soluble in these solvents include $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, lithium lower-aliphatic carboxylates, $LiAlCl_4$, LiCl, LiBr, LiI, chloroboran lithium, lithium tetraphenylborate and the like. Particularly preferred electrolytic solution is a solution of $LiCF_3SO_3$, $LiClO_4$, $LiBF_4$ and/or $LiPF_6$ in a mixed solvent of propylene carbonate or ethylene carbonate and 1,2-dimethoxyethane and/or diethyl carbonate.

Most particularly preferred electrolytic solution may contain at least ethylene carbonate and $LiPF_6$.

The amount of the electrolytic solution to be used in a battery is not particularly limited and may be selected according to the amounts of the positive and negative electrode active materials or the size of the battery.

The volumetric ratio of the solvents are not particularly limited. In the case of a mixed solvent of propylene carbonate or ethylene carbonate or butylene carbonate with 1,2-dimethoxyethene and/or diethyl carbonate, their volumetric ratio may be preferably from 0.4/0.6 to 0.6/0.4 (when ethylene carbonate and butylene carbonate or 1,2-dimethoxyethane and diethyl carbonate are jointly used, their mixing ratios are respectively 0.4/0.6 to 0.6/0.4).

Though not particularly limited, the concentration of the supporting electrolyte may be preferably in the range of from 0.2 to 3 mols per liter of the electrolytic solution.

In addition to the electrolytic solution, inorganic or organic solid electrolytes may also be employed.

Suitable examples of the inorganic solid electrolyte include a lithium nitride, a lithium halide, and a lithium oxyacid salt. Particularly effective among them are $Li_3N$, $LiI$, $Li_5NI_2$, $Li_3N$-$LiI$-$LiOH$, $LiSiO_4$, $LiSiO_4$-$LiI$-$LiOH$, $xLi_3PO_4$-$(1-x)Li_4SiO_4$, $Li_2SiS_3$, phosphorus sulfide compounds and the like.

Suitable examples of the organic solid electrolyte include polyethylene oxide derivatives or polymers containing the same, polypropylene oxide derivatives or polymers containing the same, polymers containing an ionizing group, a mixture of a polymer containing an ionizing group and the aforementioned aprotic electrolytic solution and phosphoric ester polymers.

A combination of polyacrylonitrile and an electrolytic solution and a combination of an organic solid electrolyte and an inorganic solid electrolyte are also known.

As a separator, an insulating thin film having high ion permeability and prescribed mechanical strength is used. A sheet or nonwoven fabric made of an olefin polymer such as polypropylene or the like, glass fiber or polyethylene is usually employed for their organic solvent resistance and hydrophobic properties. The pore size of the separator is selected from the range generally used for batteries, for example from 0.01 to 10 µm. The thickness of the separator is selected from the range generally used for batteries, for example from 5 to 300 µm.

For the purpose of improving charge and discharge characteristics, the electrolytic solution may contain other compounds, such as pyridine, triethyl phosphite, triethanolamine, a cyclic ether, ethylenediamine, n-glyme, hexaphosphoric acid triamide, a nitrobenzene derivative, sulfur, a quinoneimine dye, an N-substituted oxazolidinone and an N,N'-substituted imidazolidinone, an ethylene glycol dialkyl ether, a quaternary ammonium salt, polyethylene glycol, pyrrole, 2-methoxyethanol, $AlCl_3$, a monomer providing a conductive polymeric electrode active material, triethylenephosphoramide, a trialkylphosphine, morpholine, an aryl compound having a carbonyl group, hexamethylphosphoric triamide and a 4-alkylmorpholine, a bicyclic tertiary amine, an oil, a quaternary phosphonium salt, a tertiary sulfonium salt and the like.

In order to make the electrolytic solution incombustible, a halogen-containing solvent, such as carbon tetrachloride or trifluorochloroethylene, may be added to the electrolytic solution. Also, in order to make the electrolytic solution resistant to high-temperature preservation, carbonic acid gas may be incorporated thereto.

The positive or negative electrode material mixture may contain an electrolytic solution or an electrolyte. For example, it is known to add the aforementioned ion-conductive polymer or nitromethane or an electrolytic solution to the electrode material mixture.

The surface of the positive electrode active material may be modified for example by treating the surface of the metal oxide with an esterification agent, a chelating agent, a conducting high polymer, polyethylene oxide or the like.

The surface of the negative electrode active material may also be modified by, for example, providing a layer comprising an ion-conductive polymer or polyacetylene or treating with LiCl or the like.

A collector for an electrode active material may be made of any electron-conducting substance which undergoes no chemical change in an assembled battery. Suitable materials of a collector for the positive electrode include stainless steel, nickel, aluminum, titanium and calcined carbon, as well as aluminum or stainless steel with its surface treated with carbon, nickel, titanium or silver. Suitable materials of a collector for the negative electrode include stainless steel, nickel, copper, titanium, aluminum and calcined carbon; copper or stainless steel with its surface treated with carbon, nickel, titanium or silver; and an Al-Cd alloy. These materials may be subjected to surface oxidation. The collector may have a variety of forms, such as a foil, a film, a sheet, a net, a punched sheet, a lath, a porous body, a foamed body, a fibrous body and the like. Though not particularly limited, the thickness of the collector is from 1 to 500 µm.

The battery according to the present invention may have any shape, such as a coin shape, a button shape, a sheet shape, a cylindrical shape, an angular shape and the like.

A coin-shaped or button-shaped battery is generally produced by compressing a positive or negative electrode active material mixture into a pellet having prescribed thickness and diameter according to the size of the battery. A sheet, cylindrical or angular battery is generally produced by coating a collector with a positive or negative electrode active material mixture, followed by drying and compressing. The thickness, length or width of the coating layer are decided according to the size of the battery. In particular, the dry thickness after compression is preferably selected from the range of from 1 to 2,000 µm.

Drying or dehydration of the pellet or sheet can be made by employing generally used methods. Particularly, it is preferred to use hot air, vacuum, infrared radiation, far infrared radiation, electron beam and low moisture air, alone or as a combination thereof. The treating temperature may be within the range of preferably from 80° to 350° C., more preferably from 100° to 250° C. The moisture content of the entire battery may be adjusted preferably to 2,000 ppm or less, and that of the positive or negative electrode active mixture and electrolytic solution to 500 ppm or less which is preferred from the viewpoint of cycle characteristics.

Pressing of the pellet and sheet may be effected by generally used methods, but preferably by means of metal mold press or calender press. The pressing pressure is not particularly limited, but it may be preferably from 0.2 to 3 t/cm². In the calender pressing, the press rate may be preferably from 0.1 to 50 m/minute. The pressing temperature may be preferably from room temperature to 200° C.

A battery case is assembled by inserting into a case the active material mixture sheet after its rolling or folding, electrically connecting the case and the sheet, pouring the electrolytic solution therein and then covering the case with a sealing plate. Alternatively, a safety valve may be used as the sealing plate. In addition to the safety valve, various known safety elemental devices may also be attached thereto. For example, a fuse, a bimetal, a PTC elemental device or the like may be used as an overcurrent preventing elemental device. Also, in addition to the use of the safety valve, increase in the inner pressure of the battery case may be prevented by a method in which a notch is made in the battery case, a crack is made in the gasket or a crack is made in the sealing plate. Also, a battery charger may be equipped with a circuit in which overcharge and overdischarge countermeasures are provided.

The case and lead plate can be produced using electroconductive metals or alloys, such as iron, nickel, titanium, chrome, molybdenum, copper, aluminum and the like metals or alloys thereof. Welding of the cap, case, sheet and lead plate can be effected by usually used methods such as direct or alternating current electric welding, laser beam welding, ultrasonic welding and the like. As a sealing agent, asphalt and the like commonly known compounds and mixtures thereof may be used.

The application of the nonaqueous secondary battery of the present invention is not particularly limited. For example, it is useful in electronic equipment, such as notebook-size color or monochromatic personal computers, pen input personal computers, pocket-size (palmtop) personal computers, notebook-size word processors, pocket-size word processors, electron book players, pocket phones, wireless extensions of key telephone sets, pagers, handy terminals, portable facsimiles, portable copying machines, portable printers, headphone stereos, video cameras, liquid crystal TV sets, handy cleaners, portable CD systems, mini disk systems, electrical shavers, machine translation systems, land mobile radiotelephones, transceivers, electrical tools, electronic notebooks, portable calculators, memory cards, tape recorders, radios, backup powers and the like. It is also useful in national life items such as automobiles, electrically powered vehicles, motors, lights, toys, family (home) computers, load conditioners, irons, watches, stroboscopic lamps, cameras and medical equipment (e.g., pacemakers, hearing aids, massaging machines and the like), as well as in various types of military equipment and spacecraft equipment. The nonaqueous secondary battery of the present invention may also be used in combination with solar batteries.

EXAMPLES

The present invention will now be illustrated in greater detail with reference to Examples, but the present invention should not be construed as being limited thereto.

Firstly, the following describes methods for the preparation of a positive electrode sheet, a negative electrode sheet and a battery in which these sheets are employed.

A positive electrode sheet C-1 was prepared in the following manner. A mixture comprising 100 weight parts of $LiCoO_2$ (commercial product) as a positive electrode active material and 4 weight parts of acetylene black was kneaded with 6 weight parts of a water dispersion of the copolymer of the present invention (P-1, 50% in the solid content) as a binder and a portion of water, and the thus obtained slurry was coated on both sides of a collector made of aluminum foil (support) having a thickness of 30 μm. Thereafter, the thus coated material was dried and compression-molded using a calender press to prepare a strip-shaped positive electrode sheet C-1.

A negative electrode sheet A-1 was prepared in the following manner. A mixture comprising 84 weight parts of $SnSiO_3$ as a negative electrode active material and 3 weight parts of acetylene black and 8 weight parts of graphite as conducting agents was further mixed with 4 weight parts of polyvinylidene fluoride and 1 weight part of carboxymethyl cellulose as binders and then kneaded using a water as a medium. The thus obtained slurry was coated on both sides of a sheet of copper foil having a thickness of 18 μm using a doctor blade coaster. Thereafter, the thus coated material was dried and compression-molded using a calender press to prepare a strip-shaped negative electrode sheet A-1.

A lead plate was attached to a terminal part of each of the thus prepared positive and negative electrode sheets by spot welding, and the resulting negative electrode sheet was heated for 4 hours, and the positive electrode sheet for 2 hours, each at 150° C. in dry air having a dew point of −40° C. or below.

The thus prepared positive electrode sheet, a separator made of a micro-porous polypropyleneifilm (Cell Guard 2400), the negative electrode sheet and the separator were laminated in that order, and the laminate was wound up into a spiral form. In this case, the molar ratio of the positive electrode active material to the negative electrode active material was adjusted to 7.

The thus wound body was inserted into a bottoming cylindrical battery case made of nickel-plated iron, also serving as a negative electrode terminal. Next, an electrolytic solution prepared by dissolving 1 mol/liter of $LiPF_6$ in a solution of ethylene carbonate and diethyl carbonate mixed in a volumetric ratio of 1:4 was poured into the battery case. Thereafter, the battery cap having a positive electrode terminal was caulked via a gasket to prepare a cylindrical battery. In this case, the positive electrode terminal was connected to the positive electrode sheet, and the battery case was connected to the negative electrode sheet, in advance using lead terminals. A sectional view of the thus prepared cylindrical battery, named D-1, is shown in FIG. 1.

Example 1

Positive electrode sheets C-2 to C12 were prepared by repeating the just described preparation method of the positive electrode sheet C-1, except that the binder P-1 was replaced by the same weight of P-2 to P-12. In this case, however, the positive electrode sheets C-9 and C-10 were prepared using P-9 and P-10 in the following manner.

For the preparation of the positive electrode sheet C-9, a mixture comprising 100 weight parts of $LiCoO_2$ (commercial product) as a positive electrode active material and 4 weight parts of acetylene black was kneaded with 60 weight parts of a toluene solution of the binder P-9 (5% in the solid content) and an additional portion of toluene, and the thus obtained slurry was coated on both sides of a collector made of aluminum foil (support) having a thickness of 30 μm. Thereafter, the thus coated material was dried and compression-molded using a calender press to prepare a strip-shaped positive electrode sheet C-9. The positive electrode sheet C-10 was prepared in the same manner.

By preparing binders T-13 to T-16 for comparison use, C-13 to C-16 were produced in the same manner as the case of the positive electrode sheet C-1.

T-13: Water dispersion of a copolymer of acrylic acid and acrylonitrile (copolymerization ratio=15:85)

T-14: Water dispersion of a copolymer of 2-ethylhexyl acrylate and acrylonitrile (copolymerization ratio=80:20)

T-15: Water dispersion of a copolymer of 2-ethylhexyl acrylate and butadiene (copolymerization ratio=80:20)

T-16: Water dispersion of PVDF

Batteries D-2 to D-16 were prepared in the same manner as the case of the battery D-1, except that the positive electrode sheets C-2 to C-16 were used in stead of C-1.

These batteries were examined for their cycle characteristics, relative discharge capacity, first cycle efficiency and adhesive property. The results are shown in Table 1. The charge and discharge conditions were set to 4.1 to 2.7 V and 1 mA/cm². The cycle characteristics were expressed as the number of cycles when became 90% capacity of the second discharge capacity, the relative discharge capacities were expressed as a relative value when the second discharge capacity of the battery D-1 was defined as 100, and the first cycle charge and discharge efficiencies were expressed as percentage. The adhesive property was measured by sticking an adhesive tape onto each positive electrode sheet and then peeling it off at a constant rate, and the result was expressed as a ratio of un-peeled area.

TABLE 1

| Positive electrode No. | Binder No. | Cycle characteristics | Relative Capacity | Efficiency (%) | Adhesive Property (%) |
|---|---|---|---|---|---|
| *Product of the Invention:* | | | | | |
| C-1 | P-1 | 180 | 100 | 53 | 90 |
| C-2 | P-2 | 170 | 90 | 53 | 90 |
| C-3 | P-3 | 200 | 95 | 53 | 95 |
| C-4 | P-4 | 170 | 95 | 54 | 85 |
| C-5 | P-5 | 190 | 90 | 53 | 95 |
| C-6 | P-6 | 180 | 95 | 52 | 90 |
| C-7 | P-7 | 200 | 90 | 54 | 95 |
| C-8 | P-8 | 150 | 80 | 54 | 75 |
| C-9 | P-9 | 140 | 80 | 53 | 80 |
| C-10 | P-10 | 140 | 75 | 54 | 75 |
| C-11 | P-11 | 140 | 80 | 53 | 70 |
| C-12 | P-12 | 120 | 75 | 53 | 65 |
| *Comparative Product:* | | | | | |
| C-13 | T-13 | 90 | 75 | 54 | 15 |
| C-14 | T-14 | 80 | 70 | 55 | 20 |
| C-15 | T-15 | 70 | 75 | 53 | 5 |
| C-16 | T-16 | 80 | 70 | 54 | 30 |

As is evident from the results shown in Table 1, the batteries in which the copolymers of the present invention are used as binders are excellent in cycle characteristics, relative discharge capacity and adhesive property with the collector. Among the copolymers of the present invention, comparisons of P-1 with P-9 and P-4 with P-10 show that the copolymers of the present invention are advantageous when used as aqueous dispersions. Also, comparison of P-4 with P-11 shows that the acrylate is advantageous when its $R_1$ has 3 or more carbon atoms. In addition, comparison of P-1, P-8 and P-12 show that the acrylate is advantageous when it is used in an amount of 60% or more.

Example 2

Using the positive electrode sheets and negative electrode sheet A-1 of Example 1, the cycle characteristics test in Example 1 was repeated except that the molar ratio of the positive electrode active material to the negative electrode active material was changed as shown in Table 2. The results are also shown in Table 2. As is evident from the table, the positive electrodes of the present invention show excellent cycle characteristics when tested within the positive electrode active material/negative electrode active material molar ratio as defined by the present invention.

TABLE 2

| Positive electrode | Molar ratio | | | | | | | | |
|---|---|---|---|---|---|---|---|---|---|
| | 1.5 | 4.0 | 5.5 | 7.0 | 8.0 | 9.0 | 10.0 | 11.0 | 13.0 |
| C-1 | 45 | 130 | 180 | 180 | 180 | 160 | 150 | 130 | 40 |
| C-7 | 50 | 130 | 190 | 200 | 180 | 170 | 160 | 150 | 90 |
| C-13 | 40 | 50 | 60 | 90 | 70 | — | — | — | — |

Example 3

Batteries were prepared in the same manner as described in Example 1 except that the binder of the positive electrode sheet C-1 was changed as shown in Table 3, and cycle characteristics and adhesive property of the thus prepared batteries were examined. In this case, water dispersion of PVDF was used as the fluorine resin, as well as carboxymethyl cellulose (CMC). The results are shown in Table 3 in which the amount used is expressed as a solid weight. It was confirmed that cycle characteristics and adhesive property are further improved when these binders are jointly used with the copolymer of the present invention.

TABLE 3

| Positive electrode No. | Binder No. | Binder Amount | PVDF Amount | CMC Amount | Cycle characteristics | Adhesive Property |
|---|---|---|---|---|---|---|
| *Products of the Invention:* | | | | | | |
| C-1 | P-1 | 3 | 0 | 0 | 180 | 90 |
| C-17 | " | 2 | 0 | 1 | 190 | 95 |
| C-18 | " | 2.5 | 0.5 | 0 | 185 | 85 |
| C-19 | " | 2 | 1 | 0 | 180 | 75 |
| C-20 | " | 1.5 | 1.5 | 0 | 160 | 65 |
| C-21 | " | 1 | 2 | 0 | 120 | 35 |
| *Comparative Products:* | | | | | | |
| C-16 | P-16 | 0 | 3 | 0 | 80 | 30 |
| C-22 | P-16 | 0 | 2 | 1 | 80 | 35 |
| C-23 | P-16 | 0 | 1 | 2 | 80 | 30 |
| *Products of the Invention:* | | | | | | |
| C-24 | P-1 | 1.5 | 0.5 | 1 | 200 | 95 |
| C-25 | " | 1 | 1 | 1 | 185 | 95 |
| C-26 | " | 0.5 | 1.5 | 1 | 130 | 60 |

Note: The amounts indicated are the solid contents.

Example 4

Batteries were prepared in the same manner as described in Example 1 except that the positive electrode active material was changed to $LiNiO_2$, and the same evaluation was made. As a result, almost the same results as those of Example 1 were obtained. Also, similar results were obtained when $LiMn_2O_4$ was used as a positive electrode active material. These results confirm that the effects of the present invention are not dependent upon kinds of the positive electrode active material.

Example 5

Negative electrode sheets A-2 to A-17 were prepared in the same manner as described in Example 1 except that the same weight of the copolymer of the present invention was used in stead of polyvinylidene fluoride (PVDF) in the negative electrode sheet A-1. Using these sheets, adhesion between negative electrode active material mixture and copper foil was evaluated. As a result, almost the same results as those shown in the column "adhesive property" in Table 1 were obtained. In consequence, it is evident that effects of the binder of the present invention are also expressed in the negative electrode.

Example 6

A negative electrode sheet A-18 was prepared in the same manner as described in Example 1 except that the negative electrode material of Example 1 was changed to a carbonaceous material.

Also, another negative electrode sheet A-19 was prepared in the same manner as described in Example 1 except that the negative electrode material of Example 1 was changed to $LiCoVo_4$ which has been prepared by mixing CoO with $V_2O_5$ and anhydrous lithium acetate, calcinating the mixture at 900° C. for 3 hours in the air and then pulverizing the thus synthesized product using a jet mill.

In addition still another negative electrode sheet A-20 was prepared in the same manner as described in Example 1 except that the negative electrode material of Example 1 was changed to $SnSi_{0.625}Al_{0.125}B_{0.375}P_{0.25}O_{2.8}$.

When these negative electrode sheets were combined with the positive electrode sheets C-1 to C-16 of Example 1 to carry out the same tests as in Example 1, almost the same results of Inventive Example 1 were obtained. These results show that the effects of the present invention are not dependent upon the construction of negative electrode.

Thus, it is apparent that there has been provided, in accordance with the present invention, a nonaqueous secondary battery which comprises a battery case enclosing therein a positive electrode and a negative electrode capable of intercalating and deintercalating lithium and a nonaqueous electrolytic solution containing a lithium salt, wherein one or both of the positive electrode and the negative electrode contain a copolymer comprising an acrylic or methacrylic ester, acrylonitrile and a vinyl monomer having an acid moiety. The present invention renders possible production of batteries which are possessed of excellent charge and discharge cycle characteristics, high capacity and improved production fitness.

While the invention has been described in detail and with reference to specific embodiments thereof, it will be apparent to one skilled in the art that various changes and modifications can be made therein without departing from the spirit and scope thereof.

What is claimed is:

1. A nonaqueous electrolyte secondary battery which comprises a battery case enclosing therein a positive electrode and a negative electrode capable of intercalating and deintercalating lithium and a nonaqueous electrolytic solution containing a lithium salt, wherein one or both of said positive electrode and said negative electrode contain a copolymer comprising an acrylic or methacrylic ester, acrylonitrile and a vinyl monomer having an acid moiety.

2. The nonaqueous electrolyte secondary battery of claim 1, wherein said acrylic or methacrylic ester is a compound represented by the following formula (1) and said vinyl monomer having an acid moiety is acrylic acid, methacrylic acid or maleic acid:

wherein $R_1$ represents an alkyl group having 3 to 16 carbon atoms and $R_2$ represents a hydrogen atom or a methyl group.

3. The nonaqueous electrolyte secondary battery of claim 1, wherein said positive electrode contains said copolymer.

4. The nonaqueous electrolyte secondary battery of claim 3, wherein said positive electrode further contains a fluorocarbon resin and carboxymethyl cellulose.

5. The nonaqueous electrolyte secondary battery of claim 1, wherein a negative electrode active material contained in said negative electrode is an inorganic oxide which intercalates and deintercalates lithium, and the molar ratio of a positive electrode active material contained in said positive electrode to said negative electrode active material is within the range of from 2.0 to 12.0.

* * * * *